United States Patent [19]

Green et al.

[11] Patent Number: 5,237,662

[45] Date of Patent: Aug. 17, 1993

[54] SYSTEM AND METHOD WITH A PROCEDURE ORIENTED INPUT/OUTPUT MECHANISM

[75] Inventors: Kelly C. Green, Woodinville; Steven M. Jenness, Redmond; Terry L. Carruthers, Bothell, all of Wash.

[73] Assignee: Digital Equipment Corporation, Maynard, Mass.

[21] Appl. No.: 722,097

[22] Filed: Jun. 27, 1991

[51] Int. Cl.⁵ ............................................. G06F 13/00
[52] U.S. Cl. ................................................... 395/275
[58] Field of Search .................. 364/DIG. 1, DIG. 2, 364/400, 401; 395/650, 275, 925, 700

[56] References Cited

U.S. PATENT DOCUMENTS 4,246,637  1/1981  Brown et al. .
4,418,382  11/1983  Larson .
4,451,884  5/1984  Heath et al. .
4,517,641  5/1985  Pinheiro .
4,791,560  12/1988  Lahti et al. ........................... 395/375
4,947,028  8/1990  Gorog .................................. 235/381

Primary Examiner—Robert L. Richardson
Attorney, Agent, or Firm—Flehr, Hohbach, Test, Albritton & Herbert

[57] ABSTRACT

In a data processing system a structure (50) called an I/O association is constructed. An I/O association (50) is a symmetric structure which allows not only consumer (52) of a service to locate the provider (54) of the service, but it also permits the converse. In some respects, an I/O channel (32) is only half of an association (50). The association (50) describes a targeted object (56) and provides the means (57) of locating the necessary procedures to operate on the target (56). The association (50) also describes a source object (58) that is held responsible for the requested operation, as well as the means (60) of locating and invoking procedures to report results to the source object (58).

11 Claims, 5 Drawing Sheets

SYSTEM AND METHOD WITH A PROCEDURE ORIENTED INPUT/OUTPUT MECHANISM

BACKGROUND OF THE INVENTION

1. Field of the Invention

The present invention relates generally to a system and method for the fundamental input/output (I/O) service of an operating system. More particularly, it relates to such a system and method which exploits the capabilities provided by a multi-threaded executive. Most especially, the invention relates to such a system and method which provides for the natural expression of compound services, in which cascades of secondary requests are required to accomplish a given task.

2. Description of the Prior Art

The I/O service of an operating system is traditionally organized in layers. A superior layer implements a formal I/O model of the operating system. The subordinate layer, called a device handler, or "driver", provides the means of transferring information to and from a device.

This model works well in environments where only applications can make I/O service requests, but fails to accommodate gracefully other situations. For example, a device handler which must itself issue I/O requests to accomplish its task cannot directly do so. Instead, it is obliged to use elaborate back-door mechanisms to circumvent portions of the I/O service, or to elevate the request above the system service boundary to the level of a process, which is normally the only entity that may legitimately issue such requests.

This situation often arises whenever I/O requests target non-physical "devices". Non-physical "device" handlers are required to provide the illusion of a device, but actually implement a purely software function. It is often very difficult to structure software in this manner, since it becomes distorted in ways that have little to do with the actual function. This results in unnaturally complex, often inefficient, and highly bug-prone software.

For example, a network is implemented in layers of functionality, only the very lowest of which deals with a physical device. The intermediate layers perform complex tasks, and often issue I/O service requests as they execute. Nevertheless, the highest layer of the network is itself expected to conform to the requirements of the system I/O service, creating a problem with regard to the use of I/O (and often other) services of the operating system by lower network layers. This situation is not unique to network software. It also occurs in software implementing:

- disk shadowing, in which a request is replicated across many devices;
- disk striping, in which a request is divided among many devices;
- file systems, in which complex meta-data describing files must be maintained on the file device;
- distributed system services, in which the activities of several cooperating systems must be coordinated by the use of communications services.

Also known in the prior art are non-hierarchial I/O mechanisms in which a dual mode microprocessor can act either as a front-end I/O controller processor relative to a primary host processor and device or as a secondary data processor having independent storage, processing and I/O capabilities. It is further known to use a flexible mechanism in which an information exchange processor handles data transfers between multiple central processor handles data transfer between multiple processing units (CPUs) and multiple devices, including device to device transfers. Despite the existence of such prior art, there is a need for further development of a system and process for I/O services, especially for use in network software and in similar environments.

SUMMARY OF THE INVENTION

This invention provides an alternative model for system I/O services, which solves the previously described problems. A system with a procedure oriented input/output mechanism in accordance with this invention has a consumer subsystem and a provider subsystem. An input/output association binds the consumer subsystem and the provider subsystem together.

A method using a procedure oriented input/output mechanism in accordance with this invention includes providing a consumer subsystem and a provider subsystem in a data processing system. An input/output association is formed between the consumer subsystem and the provider subsystem. Input or output is performed through the input/output association.

The attainment of the foregoing and related advantages and features of the invention should be more readily apparent to those skilled in the art, after review of the following more detailed description of the invention, taken together with the drawings, in which:

DETAILED DESCRIPTION OF THE INVENTION

Figure 1:
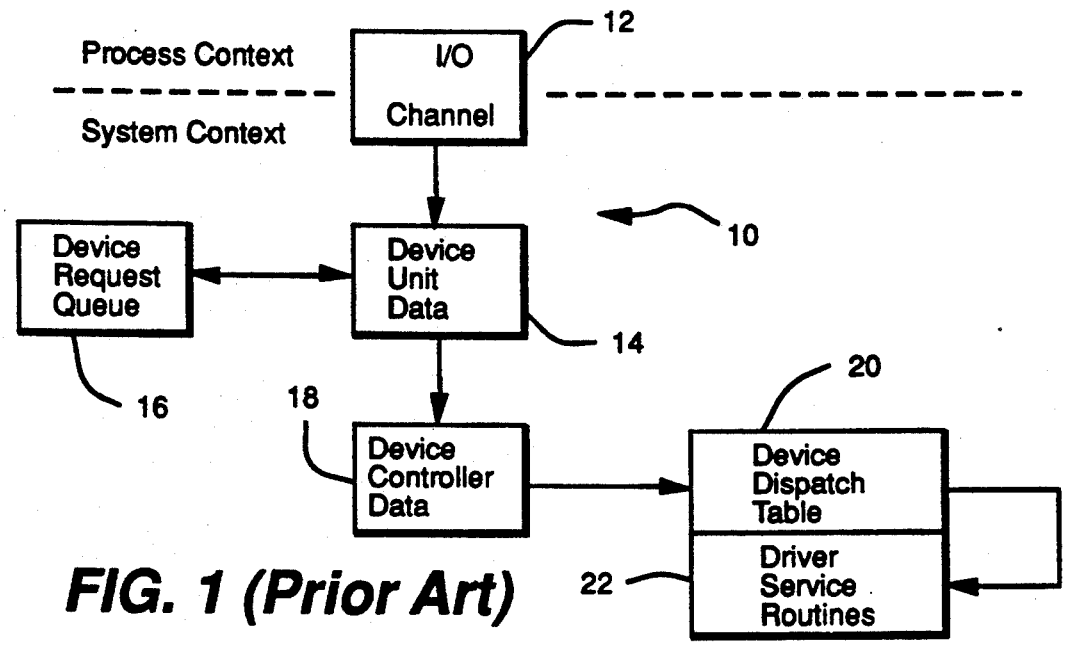
FIG. 1 is a block diagram of a prior art data structure.

In order to understand the present invention more completely, it should be compared with a typical I/O system and method organized in a traditional top-down hierarchy. Turning now to the drawings, more particularly to FIG. 1, such a prior art data structure 10 is shown. The top of the structure 10 is the I/O channel 12, which is simply a handle that identifies a particular target device by pointing to the system data structure representing the device unit. The device unit structure 14 includes all information relevant to the operation of a specific device, including a queue 16 of outstanding requests to be performed, and points to the structure 18 representing the physical controller over which the device may be accessed. The device controller structure 18 includes all information relevant to the operation of a specific device controller, as well as pointing to tables 20 and 22 of device handler subroutines with which specific functions are issued through the controller to the target device.

Figure 2:
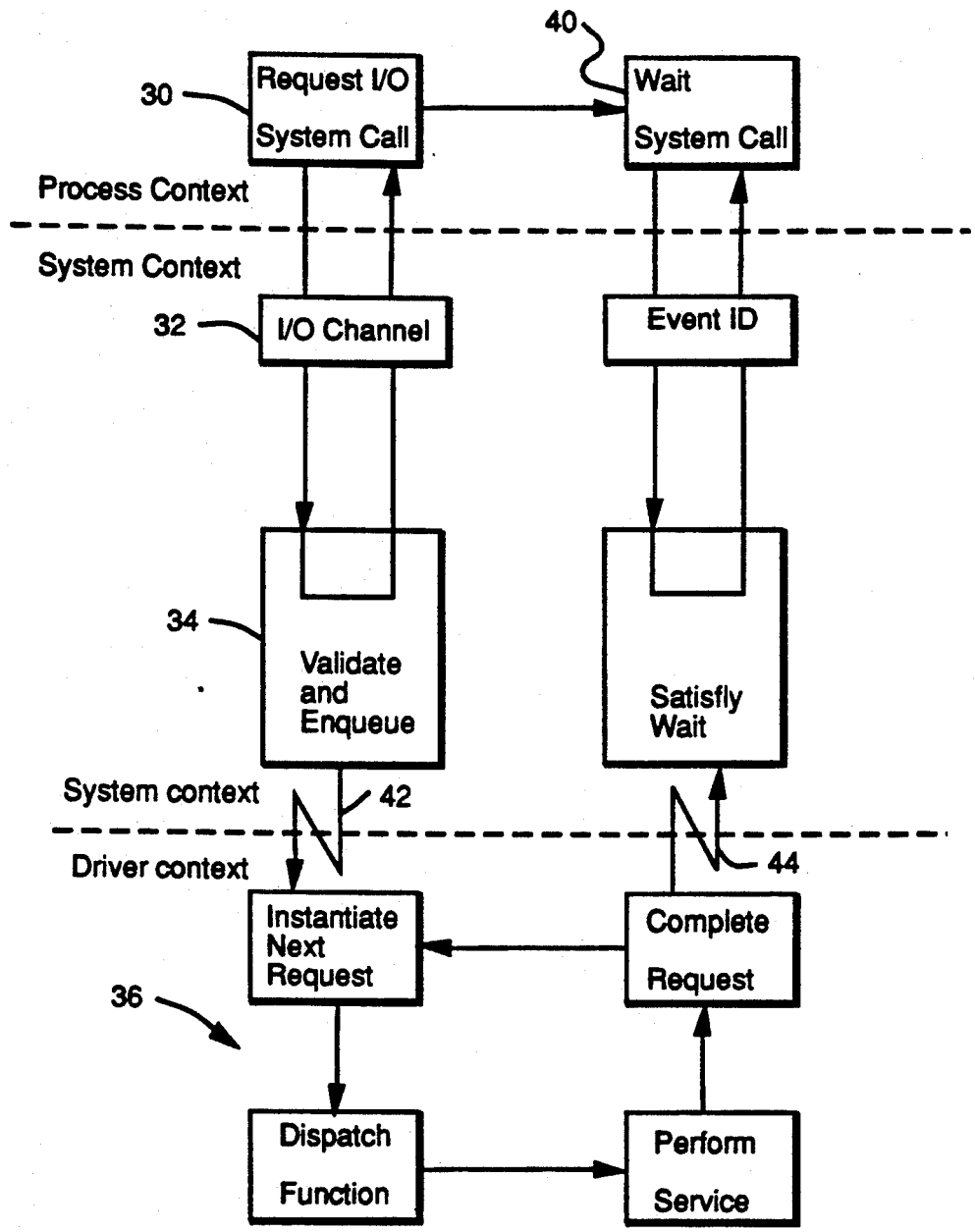
FIG. 2 is a flow chart of a prior art I/O request.

The flow of a traditional I/O request is shown in FIG. 2. An I/O request is initiated when a process issues a request I/O system call 30. This call is trapped by I/O channel 32 of the operating system and examined. If correctly expressed, the service will construct a representation of the request and queue it at 34 for later action by device handler 36. The service then returns to the issuing process at 38, which may then later invoke another service 40 to wait for the actual completion of the operation by the device handler 36.

The device handler 36 itself operates independently of the upper layers, and communicates with them via synchronization mechanisms, such as queues 42 and events 44 (indicated by jagged arrows). Device handlers usually operate in an extremely limited environment, which often does not support the expression of operations unrelated to a limited set of device management tasks.

While this brief description is based on the VAX/VMS operating system, it is not greatly different in nature from that of other operating systems, such as UNIX. The terminology may vary, but the essence remains the same. The organization of layers is strictly top-down. The services supported by lower layers are often limited to a predefined standard set. The relationship of upper and lower layers is defined by an I/O channel, and is highly asymmetric. Lower layers cannot express services commonly available to higher layers. Lower layers cannot communicate with higher layers except in very limited and highly specific ways.

Figure 3:
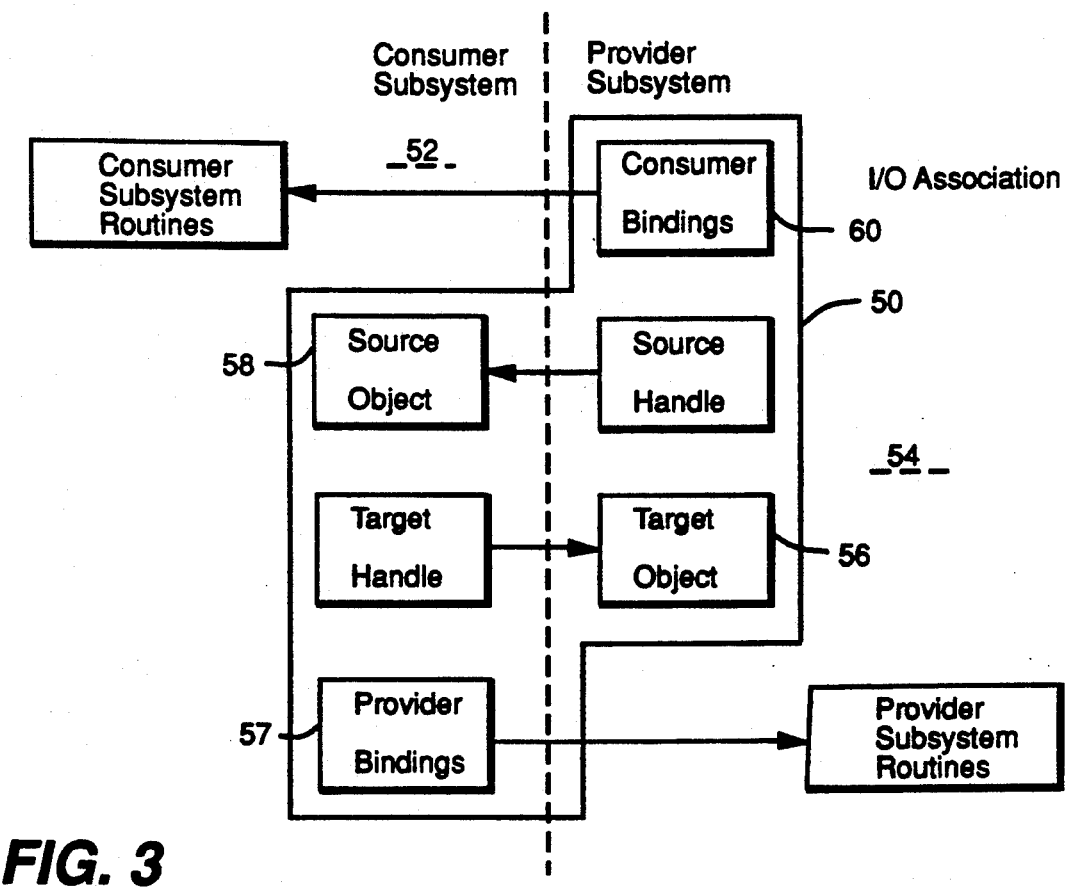
FIG. 3 is a block diagram of a data structure of a system in accordance with the invention.

In contrast, the present invention does not differentiate between superior and inferior layers, but instead treats the provider of a service and its consumer as peers. This is demonstrated first in the organization of its data structures, shown in FIG. 3.

Instead of using a channel to locate information concerning a device and its handler, a structure 50 called an I/O association is constructed. An I/O association 50 is a symmetric structure which allows not only consumer 52 of a service to locate the provider 54 of the service, but it also permits the converse. In some respects, an I/O channel 32 is only half of an association 50.

Like a channel 32, an association 50 describes a targeted object 56 and provides the means 57 of locating the necessary procedures to operate on the target 56. Unlike a channel 32, an association 50 also describes a source object 58 that is held responsible for the requested operation, as well as the means 60 of locating and invoking procedures to report results to the source object 58.

Figure 4:
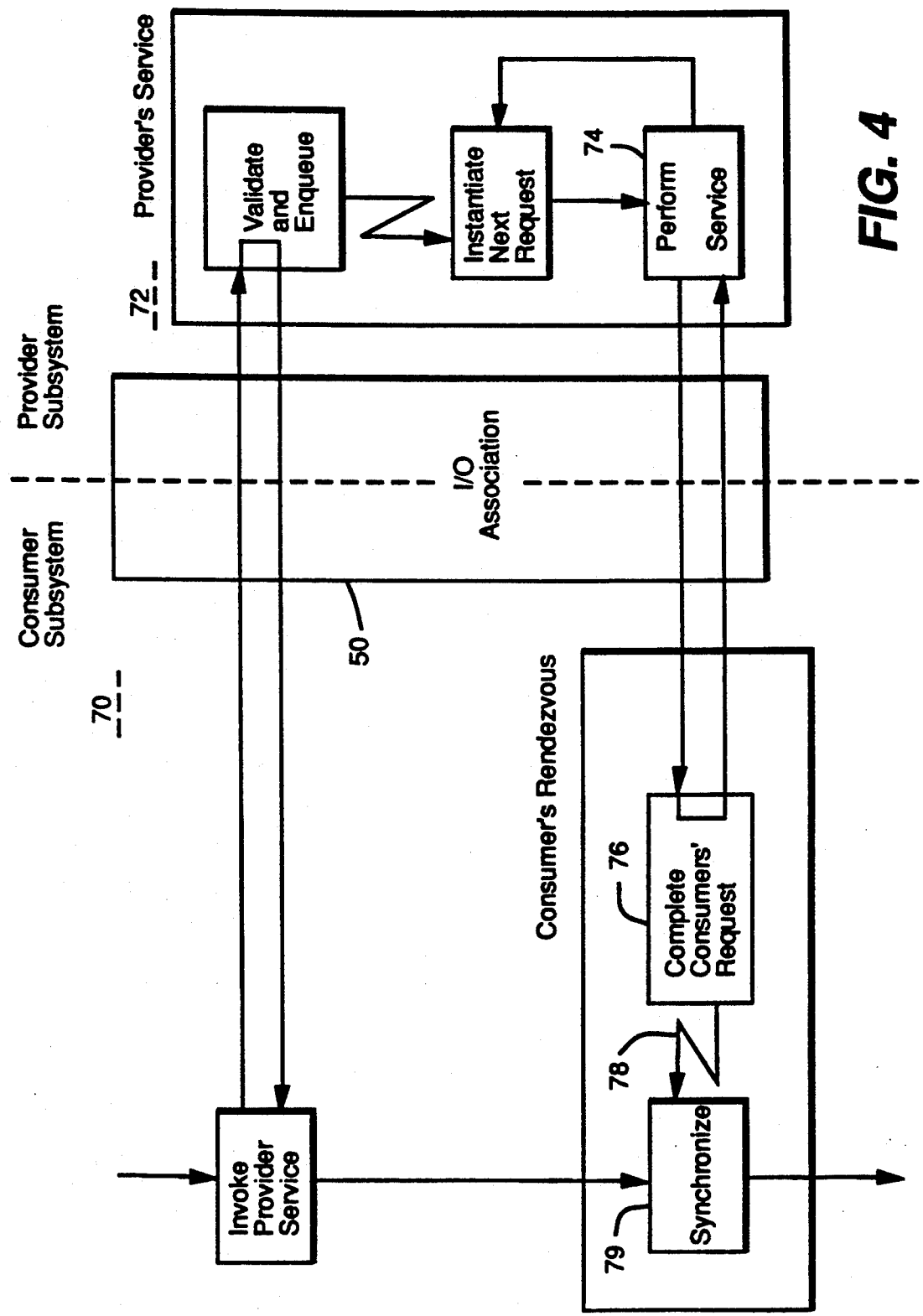
FIG. 4 is a flow chart of an I/O request of a method in accordance with the invention.

FIG. 4 shows one way of using an association 50 between two peer subsystems 70 and 72 to achieve a relationship that is analogous to that of the previously described "traditional" I/O service. In this example, the consumer 70 forms an association 50 with a target and its provider 72 and calls one of the provider's routines 74 to perform some operation on the target. Other than prior agreement on the operations supported by the provider 72, there are no constraints placed on the nature of any operation. In particular, the provider 72 may in turn form associations and call other providers to accomplish a particular task. Note that, while the operation depicted is suggestive of an operation that is queued for execution at some later time, it is not intended to restrict the range of possibility.

At a later time, when the provider 72 finishes the requested operation, it calls a completion procedure 76 provided by the consumer 70 to report the result. Other than the prior agreement on the information to be reported to the consumer 70 by the provider 72, there are no constraints placed on the nature of the completion procedure. In this case, synchronization primitives 78 (indicated by the jagged arrow) are utilized by the consumer 70 to conduct a rendezvous 79 with the originating thread of control, but the consumer 70 is free to use any mechanism appropriate for the situation. This is distinctly different from the traditional view, which severely limits the range of potential synchronization mechanisms.

Other types of relationships may be easily accommodated. For example, a service may execute synchronously, and not require a later rendezvous to determine the result. Alternatively, an asynchronously completed operation can be instantiated by creating a new thread of execution, rather than by queuing the service request to an existing thread. The latter is a natural choice for operating systems that support threads.

As another example, a provider may be requested to deliver unsolicited information to the consumer, such as changes of state or inbound data packets. The provider may emit data at unpredictable times. This is common in network software. The provider 72 and consumer 70 need only agree on the triggering conditions, the consumer's procedure to be invoked, and the information to be passed. This is more flexible than the traditional view, which generally limits the form such callback procedures may take. The VMS operating system, for example, allows only one form of callback, the Asynchronous System Trap (AST), which may pass only a single value. The UNIX operating system makes no provision for this mechanism at all.

Further understanding of the invention will be facilitated by considering a specific example involving network software. Certain background information on networks is essential for understanding the example.

Networks must support activity generated from three sources. They must service user requests, they must generate activity on their own behalf both to execute user requests and to maintain connections. They must also service external events provided by the data link. Of these, the first two are similar in many respects to that of a file system, while the last is substantially different in nature from virtually any other provider of I/O services.

The network is expected to interpret and execute user requests on demand. This entails request validation, resource allocation, quota manipulation, and the retention of state information that will influence the execution of subsequent requests.

The network may also interpret a user request in such a way that it must generate additional requests internally. Connection management (e.g., open/close), and data transfer operations may involve many secondary operations to accomplish a given end result. Connection keep alive functions will occur even in the absence of active user requests.

Unlike I/O services, the network must also respond to unexpected events from the external data link. Inbound activity may be as the result of a previously completed user request, but it may also occur as the result of user activity on some other system, or spontaneously as a result of activity conducted by and for the network itself.

External, or bottom-up, processing is every bit as important as the "traditional" top-down path resulting from local user requests. In fact, each is roughly equal in terms of the number and rate of message transfer. Consequently, it is probably incorrect to handle out-bound and inbound paths in ways that are fundamentally different from each other. Both must be efficient, and both must operate on demand. The only real distinction of any consequence is in the context in which information is processed.

Local request processing occurs in User context, at a time of the user's choice. Inbound activity, on the other hand, is primarily processed System context, and occurs at unpredictable times. It is the responsibility of the part of the network handling the inbound message stream to demultiplex inbound data items, assigning them to particular conversations (called transport end-points), and to update the state of the transport end-points as appropriate. This may result in user requests being partially or fully satisfied, the transmission of additional data as flow control windows are modified, or the retention of data for later consumption by the user.

Figure 5:
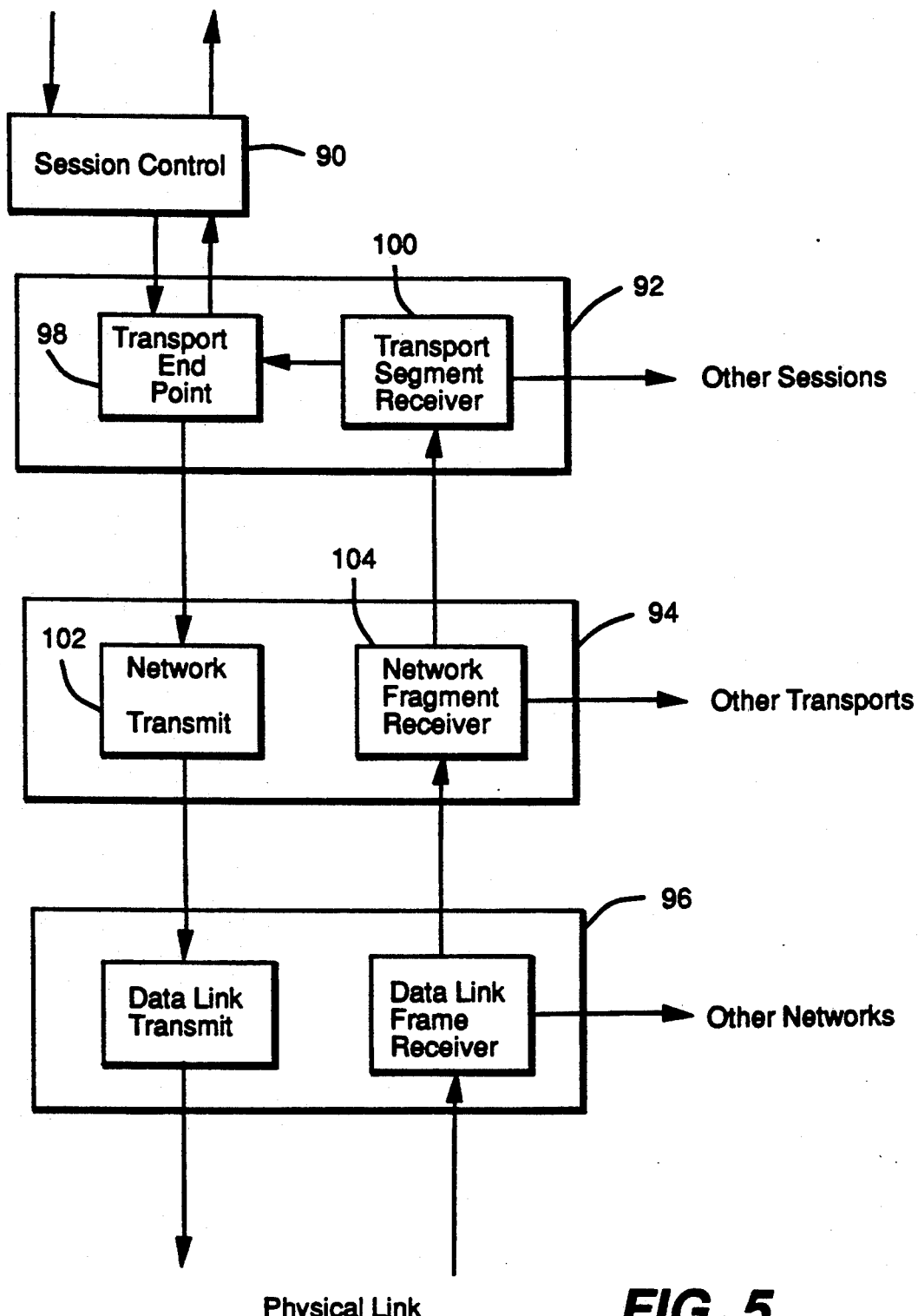
FIG. 5 is a block diagram showing functions of a network useful for further understanding of the invention.

FIG. 5 shows the functions of a network in slightly greater detail. As shown, the network is actually composed of four layers 90, 92, 94 and 96.

The Session Control Layer 90 is primarily responsible for the management of transport connections between end users. The details are not particularly relevant to understanding the present invention. The Session Control Layer 90 passes data transfer requests through to the Transport Layer 92.

The Transport Layer 92 is responsible for pacing and reliable, sequenced delivery of data between two transport end points 98. It implements a complex protocol to achieve this, which has a number of important features: (1) The Transport Layer 92 may not be able to send or provide data when requested. It may either block the requesting thread, or refuse the request entirely, depending on the characteristics of the end-point 98. (2) Transport may be able to partially satisfy a request. Depending on the characteristics of the end-point 98, Transport may block the user's thread until the entire request can be satisfied. Alternatively, the Transport Layer 92 may attempt to accomplish as much as it can, and then complete the request immediately. The user must re-issue the remainder of the request at a later time. (3) Transport breaks the user's request, which may be of unlimited size, into an ordered series of transport segments. Each segment is individually transmitted. Transport must retransmit any segments not received at their destination. In order to provide for the retransmission of lost segments, Transport must either retain access to the user's data buffer, or make a copy of the data in system memory. In practice, Transport copies the data and completes the user's request as soon as it has done so. When the recipient acknowledges receipt of a segment, the copy is deleted. (4) The Transport Layer 92 receives segments for all end-points owned by it at 100. It must demultiplex the received segments, passing the appropriate data to each end-point. Out of order segments must be reordered. Lost segments must be retransmitted by the sending Transport until acknowledged the receiving Transport. (5) Transport is also responsible for implementing any quota constraints on the amount of data received, but undelivered to the end user. Transport is the lowest layer at which the concept of distinct user assignable conversations is retained.

The Network Layer 94 is responsible for the reliable delivery of Transport data to the destination system. It does so by selecting the appropriate physical device to send the data to the next system on the way to its destination. The details are not particularly relevant to an understanding of this invention. It is sufficient to know that segments transmitted by Transport may be further broken down into fragments of a size suitable for transmission on the selected Data Link at 102. Fragments are reassembled by the Network Layer 94 at 104 into complete segments, and delivered to one of possibly several Transport Layers 92, depending on the value of an address selector. If any fragments are lost, those that are received are discarded. It is up to the Transport Layer 92 to recognize and recover from the loss.

The Data Link layer 96 is responsible for sending and receiving data over a specific physical link.

The network model so far described is naturally simplistic. There are additional characteristics that must be considered. A "real" network is in fact several networks which operate independently of each other, although they may share certain protocol layers. Only code is shareable between independent networks. The address spaces and data structures involved are completely disjoint.

Given the preceding background information, we can begin exploring the "hard" requirements that an operating system must satisfy to provide the services essential to a network.

First, the network must be able to access the user's address space and/or thread at various points in time. These are as follows:

1) When initially processing a request to read or write data. If data is available, or if data may be transmitted, it must be copied between the user's and system-provided buffers. This case is trivial. The user's thread is available to do the work.
2) When transmitting data subsequent to the initial processing of a blocking request. As flow control windows are opened, the network may be able to transmit additional portions of a user's incomplete but active request. To do so, Transport must be able to copy the additional segments of data from the user s buffer to system-provided buffers. It is necessary to either access the user's address space on behalf of the user, or to switch to the user's (blocked) thread long enough to do the work. A number of iterations may occur before the entire request can be satisfied.
3) On the arrival of data while an outstanding blocking read is in progress. The Network must be able to resume the transfer of data between system and user buffers. It is necessary either to access the user's address space on behalf of the user, or to switch to the user's (blocked) thread long enough to do the work. A number of iterations may occur before the entire request can be satisfied.
4) On the arrival of data while no read request is outstanding. This case is trivial. The network simply retains the system buffers until the user's thread descends to obtain the data, at which time the copy occurs.

Second, the Network must be able to block and unblock a user's thread at will and at any layer in the network architecture. The most obvious example is in the transport layer, but the need to block may occur elsewhere too. It is undesirable to lose thread context during blocking, which must then be recovered by some secondary mechanism.

Third, in-progress requests must be cancelable at well defined points during network processing, typically when blocking has occurred and an arbitrary time may elapse, or at explicitly selected checkpoints.

Fourth, there must be a means to allow each layer in the network to maintain state information. In addition, some layers may in fact be used in several different networks, and thus must present independent instances of such state information.

Fifth, there must be a means of targeting different implementations of a given layer. Although not explicitly shown in prior diagrams, there may in fact be several implementations of a given layer. These may represent alternative protocols to perform similar functions, or may also represent different implementations of the same protocol.

Sixth, although there is currently no means to express the concept with existing application programming interfaces, it is likely that future interfaces will be defined that require the distinction between buffer blocking and thread blocking. Existing interfaces deal only with thread blocking. Buffer blocking will permit the direct use of user buffers, and provide subsequent notification of when ownership of the buffer is returned. This will result in a reduction in the number of data copies that must otherwise occur, and consequently may attain greater throughput.

In addition to hard requirements, there are some highly desirable features:

(1) There should be no great difference in the mechanisms providing upward and downward flows of data. The network must field both with equal facility.

(2) The network should not be aware of any differences between the various styles of thread and buffer blocking. The code should be the same regardless of any high level options chosen regarding the style of I/O to perform.

(3) Finally, there are fundamental I/O services. By this is meant basic services, such as request cancellation, thread synchronization mechanisms, and buffer and thread blocking services. Ideally, these services should be mix-and-match. That is, the network, or any other subsystem, should be able to take advantage of a subset of I/O services, rather than on an all or nothing basis. This turns the I/O architecture into a collection of fundamental services that the functional code calls to accomplish its tasks, and is a profoundly different point of view than the traditional approach.

What are the fundamental services that one might need? These fall into four functional categories:

1. Association Management
   (a) Registration of I/O services
   (b) Formation of I/O associations
   (c) Destruction of I/O associations Registration is the method by which an I/O provider declares its service to the operating system using IO_register_service giving the following data:

(a) The name of the service provided.
(b) A routine to be called when an association is to be formed.
(c) A routine to be called when an association is being destroyed.

Formation of an I/O association consists of the following:

(a) Both the consumer and provider register their services with the operating system.
(b) The consumer calls IO form association, identifying both itself and the desired service provider.
(c) The service provider is called at its "form association" entry point with the proposed association, which it may decline.

(d) If accepted, the association is returned to the consumer as well.

Destruction of an association may be proposed by either the consumer or provider. In this event, the "destroy association" entry points of both the consumer and provider are called. All activity on the association is then terminated.

2. Request Control
   (a) Request queuing
   (b) Request initiation
   (c) Request cancellation
   (d) Request completion 3. Thread Synchronization
   (a) synchronize work-thread with work-enabling conditions
   (b) synchronize work-thread with request cancellation
   (c) synchronize requesting-thread with request completion
   (d) synchronize requesting-thread with buffer return 4. Support
   (a) Buffer locking/unlocking/overmapping
   (b) Post and interrogate I/O status These services operate on structure called an I/O descriptor. A pointer to an I/O descriptor is called an I/O handle. The I/O descriptor is an opaque object to all but the I/O service routines. The descriptor contains the following items (not exhaustive):

(1) An identification block, proclaiming this to be an I/O descriptor of a particular size. The size is variable.
(2) Links for placement of the descriptor onto a thread-based I/O rundown queue.
(3) Links for placement of the descriptor into an I/O service queue.
(4) Links for placement of the descriptor into a buffer return queue.
(5) Options cells describing the semantics of the I/O operation to be performed, e.g., thread blocking or non-blocking, buffer synchronous or asynchronous, cancelable or non-cancelable, and so forth.
(6) An event object for blocking the work-thread until progress can be made.
(7) An event object for synchronizing the requesting-thread with request completion.
(8) An I/O status block for holding the intermediate and final request status.
(9) A reference pointer to the requesting-thread.
(10) A reference pointer to a buffer return queue synchronization object.
(11) The address of a routine buffer is to be returned.
(12) The address of a routine to be called when the request is started. This routine expects to be given a pointer to . . .
(13) an arbitrary context structure.

The request control procedures consist of the following:

(1) io_start_request—construct and initiate an immediate I/O request, without placement on an I/O service queue, but with placement on the thread I/O rundown queue. This might be used for control requests, as opposed to transfer requests. An I/O handle is returned.

(2) io_enqueue_request—construct and enqueue an I/O request onto a given I/O service queue, as well as on the thread I/O rundown queue. The request is initiated only if the I/O service queue was initially empty. An I/O handle is returned.

(3) io_cancel_request—remove a specific request for all queues and cancel it.

(4) io_cancel_queue—remove and cancel all requests on a given I/O service queue. A protocol layer would use this prior to shutdown.

(5) io_rundown_thread—remove and await completion of all requests on a thread's I/O rundown queue. A thread would use this prior to deletion.

(6) io_complete_request—post the final request status into the I/O descriptor and remove the request from all queues. If the request was removed from an I/O service queue, the next request is initiated. Deletion of the I/O descriptor occurs when all references (I/O handles) to it are returned.

Thread synchronization procedures consist of the following:

(1) io_wait—wait until the I/O wait event is signalled, indicating that progress can be made, or attention is required (e.g., cancellation).

(2) io_wake—signal the I/O wait event.

(3) io_synch—wait until the I/O completion event is signalled.

(4) io_return_buffer—place the I/O descriptor onto the buffer return queue, signalling the queue.

Support procedures consist of the following (1) io_post_status—post intermediate request status into the status block of the I/O descriptor.

(2) io_get_status—determine current request status from the I/O descriptor.

(3) io_lock-buffer—lock down a buffer for direct transfer.

(4) io_unlock_buffer—unlock a previously locked buffer.

(5) io_check_cancel—test for cancellation outside of an io wait.

(6) io_reference—generate an additional reference against the specified I/O descriptor.

(7) io_dereference—return a reference.

(8) io_receive_buffer—remove an I/O descriptor from a buffer return queue, returning a pointer to and the size of the returned buffer.

Interestingly enough, this sort of scheme is compatible with transaction semantics. One option on the IO_START request might be to request TP semantics, in addition to I/O semantics.

Figure 6:
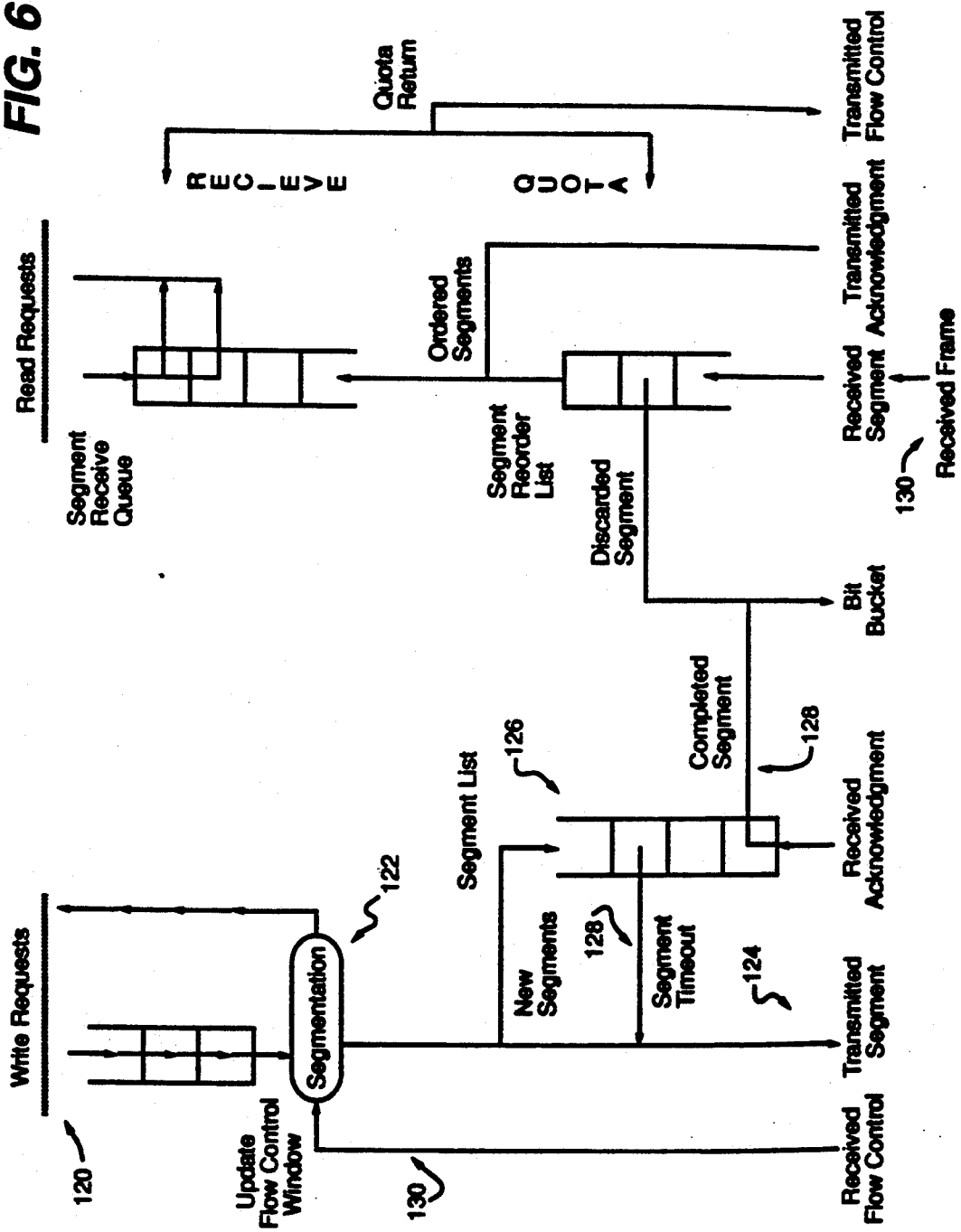
FIG. 6 is a more detailed flow chart of a network write operation that will be described using the methods of FIG. 4.

FIG. 6 displays the relationships of the various routines and structures. Perhaps the best way to illustrate how such a scheme might benefit networks is to show its use during a typical operation. A write operation is shown, with the data flows involved.

The user issues a write request 120 for his buffer. Note that existing APIs are always both thread and buffer synchronous in nature, but that the request may or may not thread block, depending on the characteristics of the end-point in use. The user request resembles the following:

status=write (socket, & buffer, size & ret_size); Session eventually gets the write request, determines which end-point to use, and passes the write request on to Transport, using the "write_buffer" method of the transport association. Because Session must report the result thread synchronously, it does so with a sequence similar to the following, which will work for any mode of operation supported by Transport, including ASYNCHRONOUS.

```
lock session_port for reading.
```

-continued
```
        status = session_port.transport.write_buffer
            (&session_port.transport_end_point,
                        &buffer,
                        size,
                        &io_handle):
    unlock session_port;
    if (!status) then RAISE_EXCEPTION (status);
    io_synch (io_handle);
    to_get_status (io_handle, &iosb);
    io_dereference (io_handle);
    *ret_size = iosb.total_bytes_transferred;
    return (iosb.status);
```

Transport then begins processing the request n the specified end-point. Depending on the characteristics of the specified end-point, it may operate in either thread_blocking or nonblocking modes. Also, since multiple threads and/or processes may actually be operating on the same end point at the same time, it must serialize the requests with a queuing mechanism. Finally, since Transport wants to parallelize the transmission of each segment of any given request, it will issue ASYNCHRONOUS operations to the network layer. Requests are issued using the "write_segment" method of an association to the network layer. The code resembles the following:

```
lock end_point for reading;
if end_point.state <> RUN then
{
    unlock end_point;
    RAISE_EXCEPTION (WRONG_STATE);
}
/*
* try to initiate the operation with the I/O semantics of the
end_point. This
* is either BLOCKING, NONBLOCKING or
ASYNCHRONOUS.
* If asynchronous operation is selected, a thread will be forked
to continue I/O
* processing, while the calling thread will issue an
ASYNCHRONOUS_RETURN exception.
* Note that no existing API requires ASYNCRONOUS
operations.
*/
TRY
{
    status = io_start (&io_handle, endpoint.io_mode);
    unlock end_point;
}
EXCEPTION (ASYNCRONOUS_RETURN)
{
    unlock end_point ;
    return (status_pending);
}
ENDTRY
if (!status) then return (status);
/*
* Serialize competing requests by queuing them.
*/
lock end_point for writing;
link the io_handle at the end of the end_point.request_queue
/*
* If there are requests in front of us, release the end_point and
wait.
* The request will be woken when it reaches the front of the
queue.
* The wait may be semantically forbidden, resulting in an
immediate error,
* The wait may be canceled, which is also an error.
*/
if there is another entry already on the request_queue then
{
    unlock end_point;
    status = io_wait (io_handle, CANCELABLE);
    if (!status) then return (status);
    lock end_point for writing;
```

```
};
while data remains to be transmitted then
{
    if the flow control window is open and transmit quota is
    available then
    /*
     * construct and write the next segment of the buffer
     * (122 in FIG. 6)
     */
    {
        allocate memory for the next segment;
        copy the data and build the segment header;
        status = end_point.network.write_segment
            (&end_point.network_nsap,
                            &end_point.destination_address,
                            !TRY_HARD,
                            &segment.buffer,
                            segment.size,
                            &segment.header,
                            segment.header_used_size,
                            segment.header_free_size,
                            ASYNCHRONOUSLY,
                            &segment.io_handle); (124 in
                            FIG. 6)
        /*
         * if the write worked, then link the segment onto the end_point
         * segment queue for retransmission and acknowledgment
         * processing
         * otherwise, delete it and fail the remainder of the write
         */
        if (status) then
        {
            link the segment at end of end_point.segment_queue;
            modify end_point.transmit_window; (126 in FIG. 6)
            start segment timer;
        } else {
            /*
             * The transmit window is closed, or we have no quota.
             * We must wait for flow control to reopen the window, or
             * for acknowledgments to free up transmit quota.
             */
            unlock end_point;
            status = io_wait (io_handle, CANCELABLE);
            lock end_point for writing;
        }
        /*
         * check for errors. Finish request if found
         */
        if (status == some_error) then break;
    } /* end while */
    /*
     * at this point, we see no hope of resuming.
     * Propagate the next request, and finish up the current one.
     * Outstanding segment I/Os are finished as acknowledgments
     * arrive.
     */
    dequeue io_handle from front of end_point.request_queue;
    if end_point.request_queue is not empty then
        io_wake (end_point.request_queue.first_entry.io_handle);
    unlock end_point;
    /*
     * If io_finish is called with a forked work thread,
     * the thread will be consumed.
     */
    io_finish (io_handle, status, total_bytes_transferred);
    return (status_success);
```

Timer processing occurs in one of a collection of system owned timer threads. Since a pool of transport-owned threads is available to process timeouts, and only one segment is involved, BLOCKING I/O is used. The "write_segment" method of the network association is used to retransmit the timed-out segment.

```
net_timeout (&segment)
{
    /*
     *given the saegment, use a backpointer to find the
     end_point.
```

```
     *Lock the endpoint, synchronize with the prior write,
     * and write the segment again. (128 in FIG. 6)
     */
    end_point = segment.end_point;
    lock end_point for writing;
    io_synch (segment.io_handle);
    io_dereference (segment.io_handle);
    update segment.retry_count;
    if segment.retry_count > en d_point.transport.retry_limit
    then
    {
        end-point.state = FAILED;
        remove segment from retransmit_queue;
        delete segment;
    } else {
        status = end_point.network.write_segment
            (&end_point.network_nsap,
                            &end_point.destination_address,
                            (124 in FIG. 6)
                            !TRY_HARD,
                            &segment.buffer,
                            segment size,
                            &segment.header,
                            segment.header_used_size,
                            segment.header_free_size,
                            BLOCKING,
                            &segment.io_handle);
        restart segment timer;
    }
    unlock end_point
}
```

Acknowledge processing occurs in an independent system context. Acknowledgments are targeted as a connection_ed, which is in turn mapped to the target end_point. Acknowledged segments are remove and deleted. This returns transmit quota, which may enable a stalled write to continue.

```
segment_acknowledge (end_point, ack_number)
{
    lock end_point for writing;
    while not at end of segment queue;
    {
        if segment acknowledged then
        {
            io_synch (segment.io_handle);
            io_dereference (segment.io_handle);
            remove segment from retransmit_queue;
            delete segment; (128 in FIG. 6)
        }
        if write stalled due to lack of transmit quota and
        sufficient quota is now available then
            io_wake
             (end_point.request_queue.first_entry.io_handle);
    }
    unlock end_point;
}
```

Flow control processing occurs in an independent system context. Flow control updates are targeted at a connection_id, which is in turn mapped to the target end_point. The flow control window is modified as directed, which may enable a stalled write to continue.

```
received_flow_control (end_point, flow_control_data) (130 in FIG.
6)
{
    lock end_point for writing;
    update end_point flow control window;
    if write stalled due to flow control and window is now
    open then
        io_wake (end_point.request_queue.first_entry.io_handle);
    unlock end_point;
```

-continued

```
}
```

The example could be carried further, but already illustrates the major features of the interface, which are:
1) The resulting code is well organized into complete functional modules, which are not artificially broken apart in strange places to handle request validation, initiation and multiple partial completions involving non-obvious control and context transfer. The result is much more readable and maintainable, as well as far less likely to be buggy. It is abundantly clear what is happening when waits and synchronization operations occur.
2) Context is retained across wait points. Operations resume in a simple and obvious manner.
3) Parallelization is natural, largely transparent, and may be quota constrained by the resources available to the parent process.
4) Fan-out occurs in such a way that called layers may decide to forgo parallelization without confusing the issuer. The calling routine enables fan-out via requests for ASYNCHRONOUS operation. The called routine may intelligently decline if it will not really benefit from it. For example, although ASYNCHRONOUS requests are made of the network layer, it may decide that the segment size is such that it does not require additional fragmentation, and hence is not worth the effort to fork a thread just to write the segment to the DataLink. In that case, it would convert the ASYNCHRONOUS operation to a BLOCKING operation at io_start. Other than that, there is no additional code difference to either layer.

For receive processing, as mentioned earlier, there should be no real difference in how "upward" and "downward" processing operates. To see how that might work, assume the NI DataLink receives a frame and by examining the protocol type determines that it should go to a particular Routing Layer. One member of a pool of receive threads removes the frame from the receive ring, and provides the frame to routing by calling the "deliver_frame" method of the routing association:

```
forever {
    remove buffer from receive list;
    status = protocol.deliver_frame
        (protocol.routing_instance,
        &buffer,
        size,
        POST_BUFFER,
        &frame.io_handle); (130 in FIG. 6)
    if (status) then
    {
        io_synch (frame.io_handle, CANCELABLE):
        io_dereference (frame.io_handle);
    }
    return buffer to free list;
}
```

The POST_BUFFER mode represents the unnamed I/O mode referred to below. It permits thread blocking with asynchronous buffer return. This seemingly strange combination is actually useful, since the buffer will eventually wind up on a queue, while no further use of the posting thread can be made. When the buffer is eventually consumed by a recipient, the I/O operation is finished, permitting the receive thread to continue operation, freeing the buffer and looking for more work.

It is not necessary to carry this example further, as it already shows the most important point. I/O services defined in this manner are capable of fully symmetric operation. In the example at hand, the problem of a buffer return delayed relative to thread return is solved in a simple and elegant manner, with the additional benefit of decoupling the final recipient of any knowledge of where the buffer must eventually be returned.

From the user's point of view, I/O request issuance has four forms, as shown in the table below. These forms are related to the ownership of the user's thread of control and data buffers. A user's call to an I/O service temporarily gives ownership of the thread and buffers to the service. When the I/O service gives them back depends on the I/O request form.

|  | Buffers | |
| --- | --- | --- |
|  | Synchronous | Asynchronous |
| Thread Blocking | (1) Blocking | (2) |
| NonBlocking | (3) NonBlocking | (4) Asynchronous |

(1) Usually called "synchronous" or "blocking" I/O. The user's thread blocks until I/O completion is done (successful or not). When the thread returns from the I/O request, ownership of the buffer is also released back to the user. The network may freely make use of both the user s thread and buffer until completion occurs.
(2) Unnamed, and usually not provided. The thread blocks until the I/O operation has completed. The data buffer may not be needed during late parts of the I/O operation so it can be released to the user before the thread returns. The return of the buffer is indicated through a secondary status mechanism. This form makes sense only in multi-threaded environments. It is useful for request/response transports to build a "send response and wait for next request" I/O service. The buffers used to describe the response should be released before the next request is received.
(3) Usually called "non-blocking" I/O; miscalled "asynchronous" I/O. The thread does not block in the I/O service. If I/O progress cannot be made, the thread returns immediately and so indicates. The buffer is released back to the user when the thread returns. The network may freely make use of both the user's thread and buffer until further progress becomes impossible, or completion occurs.
(4) Usually called "asynchronous" I/O. The thread does not block in the I/O service. When the thread returns the buffer may still be owned by the I/O service. Ownership of the buffer and completion indication of the I/O is passed back to the user through a secondary mechanism.

It can be shown that each of the forms can provide the same I/O functionality. The specific form used is determined by the type of processing to be performed. It is important to note that the I/O scheme described previously is capable of expressing all four modes. Traditional approaches generally limit the available modes of operation.

It should be apparent to those skilled in the art that various changes in form and details of the invention as shown and described may be made. It is intended that such changes be included within the spirit and scope of the claims appended hereto.

What is claimed is:

1. An input/output system for a data processing system, said input/output system comprising a plurality of subsystems, said plurality of subsystems including:
   a consumer subsystem including consumer subsystem routines for controlling input/output operations between said consumer subsystem and any other of said plurality of subsystems, and a source object, accessible by other ones of said plurality of subsystems, that defines said consumer subsystem;
   a provider subsystem including provider subsystem routines for controlling input/output operations between said provider subsystem and any other of said plurality of subsystems, and a target object, accessible by other ones of said plurality of subsystems, that defines said provider subsystem; and
   an input/output association binding said consumer subsystem to said provider subsystem, said input/output association including:
   a source handle in said provider subsystem enabling said provider subsystem to access said source object;
   a target handle in said consumer subsystem enabling said provider subsystem to access said source object;
   consumer bindings in said provider subsystem for enabling said provider subsystem to access said consumer subsystem routines when performing input/output operations between said provider subsystem and said consumer subsystem; and
   provider bindings in said consumer subsystem for enabling said consumer subsystem to access said provider subsystem routines when performing input/output operations between said consumer subsystem and said provider subsystem.

2. The input/output system of claim 1 in which said consumer subsystem includes means for invoking a provider service by calling one of said provider subsystem routines, said provider subsystem includes a means for validating and enqueuing requests for provider service, said means for invoking a provider service and said means for validating and enqueuing requests being connected through said input/output association.

3. The input/output system of claim 2, said provider subsystem routines in said provider subsystem including a means for performing a provider service, said consumer subsystem routines in said consumer subsystem including a means for providing a completion procedure, said means for performing a provider service and said means for providing a completion procedure being connected through said input/output association.

4. The input/output system of claim 3 in which said means for validating and enqueuing requests is connected to said means for performing a provider service through a means for instantiating a next request.

5. The input/output system of claim 3 in which said means for providing a completion procedure is connected to a means for synchronizing said consumer subsystem with a controlling system.

6. An input/output system which comprises a data processing system including
   a consumer subsystem including consumer subsystem routines for controlling input/output operations between said consumer subsystem and any other subsystem in said data processing system,
   a provider subsystem including provider subsystem routines for controlling input/output operations between said provider subsystem and any other subsystem in said data processing system, and
   a non-hierarchical input/output association binding together said consumer subsystem and said provider subsystem as peers, said input/output association including:
   consumer bindings in said provider subsystem for enabling said provider subsystem to access said consumer subsystem routines when performing input/output operations between said provider subsystem and said consumer subsystem; and
   provider bindings in said consumer subsystem for enabling said consumer subsystem to access said provider subsystem routines when performing input/output operations between said consumer subsystem and said provider subsystem.

7. The input/output system of claim 6 in which said consumer subsystem includes a means for involving a provider service by calling one of said provider subsystem routines, said provider subsystem includes a means for validating and enqueuing requests for provider service, said means for invoking a provider service and said means for validating and enqueuing requests being bound together by said input/output association.

8. The input/output system of claim 6, said provider subsystem routines in said provider subsystem including a means for performing a provider service, said consumer subsystem routines in said consumer subsystem including means for providing a completion procedure, said means for performing a provider service and said means for providing a completion procedure being connected through said input/output association.

9. In a data processing system, a method for controlling input/output operations in the system, comprising:
   providing a consumer subsystem including consumer subsystem routines for controlling input/output operations between said consumer subsystem and any other subsystem in said data processing system,
   providing a provider subsystem including provider subsystem routines for controlling input/output operations between said provider subsystem and any other subsystem in said data processing system,
   forming an input/output association between the consumer subsystem and the provider subsystem, said input/output association enabling said consumer subsystem to access the provider subsystem routines in said provider subsystem and enabling said provider subsystem to access the consumer subsystem routines in said consumer subsystem, and
   performing input/output operations therebetween through the input/output association.

10. The method for input or output of claim 9 in which said consumer subsystem initiates an input/output operation by making a request for a provider service through the input/output association, and validating and enqueuing the request for the provider service in the provider subsystem.

11. The method for input or output of claim 9 in which an input/output operation is performed by performing a provider service by calling one of said provider subsystem routines in the provider subsystem, signaling completion of the service to the consumer subsystem through the input/output association, and performing a completion procedure by calling one of said consumer subsystems routines in the consumer subsystem.

* * * * *

UNITED STATES PATENT AND TRADEMARK OFFICE
CERTIFICATE OF CORRECTION

PATENT NO. : 5,237,662
DATED : August 17, 1993
INVENTOR(S) : Kelly C. Green et al.

It is certified that error appears in the above-identified patent and that said Letters Patent is hereby corrected as shown below:

Column 16,
Line 19, delete "involving" and insert therefor -- invoking --

Signed and Sealed this

Twenty-first Day of June, 2005

JON W. DUDAS
*Director of the United States Patent and Trademark Office*